United States Patent [19]
Lindsey et al.

[11] 3,797,847
[45] Mar. 19, 1974

[54] COLLAPSIBLE AND PORTABLE CART FOR FLEXIBLE TRASH

[76] Inventors: Eleanor Ruth Lindsey; Gordon A. Lindsey, both of 2124-E Contez St., West Covina, Calif. 91791

[22] Filed: Sept. 29, 1972

[21] Appl. No.: 293,399

[52] U.S. Cl. .................................. 280/36 C, 248/98
[51] Int. Cl. ............................................ B62b 11/00
[58] Field of Search ...................... 280/36 C; 248/98

[56] References Cited
UNITED STATES PATENTS

| | | | |
|---|---|---|---|
| 3,041,026 | 6/1962 | Wilson | 280/36 C X |
| 1,718,962 | 7/1929 | Kimball | 280/36 C |
| 3,666,283 | 5/1972 | Stevens | 280/36 C X |
| 779,124 | 1/1905 | Haffey | 248/98 |
| 2,061,623 | 11/1936 | Guy | 280/36 C |

FOREIGN PATENTS OR APPLICATIONS

| | | | |
|---|---|---|---|
| 214,997 | 8/1967 | Sweden | 248/98 |
| 646,685 | 11/1950 | Great Britain | 280/36 C |

*Primary Examiner*—Leo Friaglia
*Attorney, Agent, or Firm*—Hugo E. Weisberger

[57] ABSTRACT

A collapsible and portable cart for trash bags comprises a wheeled U-shaped tubular main frame, a braced supporting frame carrying a web of flexible plastic material providing a platform, a U-shaped frame for holding up the upper end of the bag for loading including means for clamping the open bag edge against the outer sides of the tubular frame, and a hinged cover for closing the bag.

9 Claims, 8 Drawing Figures

COLLAPSIBLE AND PORTABLE CART FOR FLEXIBLE TRASH

BACKGROUND OF THE INVENTION

The present invention relates to a mobile, collapsible, and portable wheeled cart for holding and transporting trash bags, particularly plastic trash bags.

The increased emphasis on environmental protection has led to widespread adoption of flexible, disposable containers for the removal of household and garden trash, cut grass, leaves, and the like, as well as domestic garbage. In order to hold the bag open for filling, and to move it about during use, various devices have been developed in the prior art in the form of carts, racks, hand trucks, and the like, which are characterized by the employment of rather massive and heavy frames and auxiliary supporting members, making them difficult and slow to assemble or disassemble, and requiring considerable physical effort to move from place to place. The means adopted for holding and supporting the bags in these devices have involved cumbersome expedients ranging from holding the open edge by prongs, hooks or clips, to clamping the edge between pairs of tubular frames, all making it difficult to disengage the bag from the apparatus when ready for disposal.

SUMMARY OF THE INVENTION

In accordance with the present invention, there is provided a novel mobile, collapsible and portable wheeled cart for holding and transporting flexible trash bags, comprising readily assembled and light weight structural elements or components. These elements include a vertical main frame having an inverted U-shape configuration, the cross member of which serves as a handle. The lower ends of the frame provide support for an axle and a pair of wheels. The main frame is provided with three independent detachably mounted structures which, in a manner to be described more fully below, enable the cart to perform three basic functions in respect to a flexible bag placed thereon: (1) support means for the bag; (2) means for holding the upper end of the bag open; and (3) providing the bag with an effective cover.

The bag support means comprises a heavy wire frame pivotally mounted on the main frame perpendicular thereto and provided with brace members, and carrying a panel or web of flexible material such as plastic on which the bag rests. An auxiliary web of plastic material may be provided extending between the lower portions of the main frame legs, to protect the bag against lateral displacement when the cart is moved.

The means for holding the bag open constitutes a unique feature of the apparatus of the invention, and comprises a U-shaped wire frame member, mounted, with accompanying brace members, on the upper portions of the main frame. The outer ends of the bag holding wire frame including a downwardly bent segment of the wire which serves as a spring clip to hold edge portions of the bag adjacent thereto open and against the main frame. The bag edges are draped over the other portions of the wire frame so that the bag is held open on three sides, in a manner explained more fully below.

A third wire frame fitted with a web of plastic or other material is pivotally mounted on the legs of the frame above the bag opening extension means, and when moved into registry with the latter, serves to provide a reasonably tight cover for the bag.

DETAILED DESCRIPTION OF THE INVENTION

The following is a more detailed description of a presently preferred embodiment of the invention, as illustrated in the accompanying drawings, in which.

Figure 1:
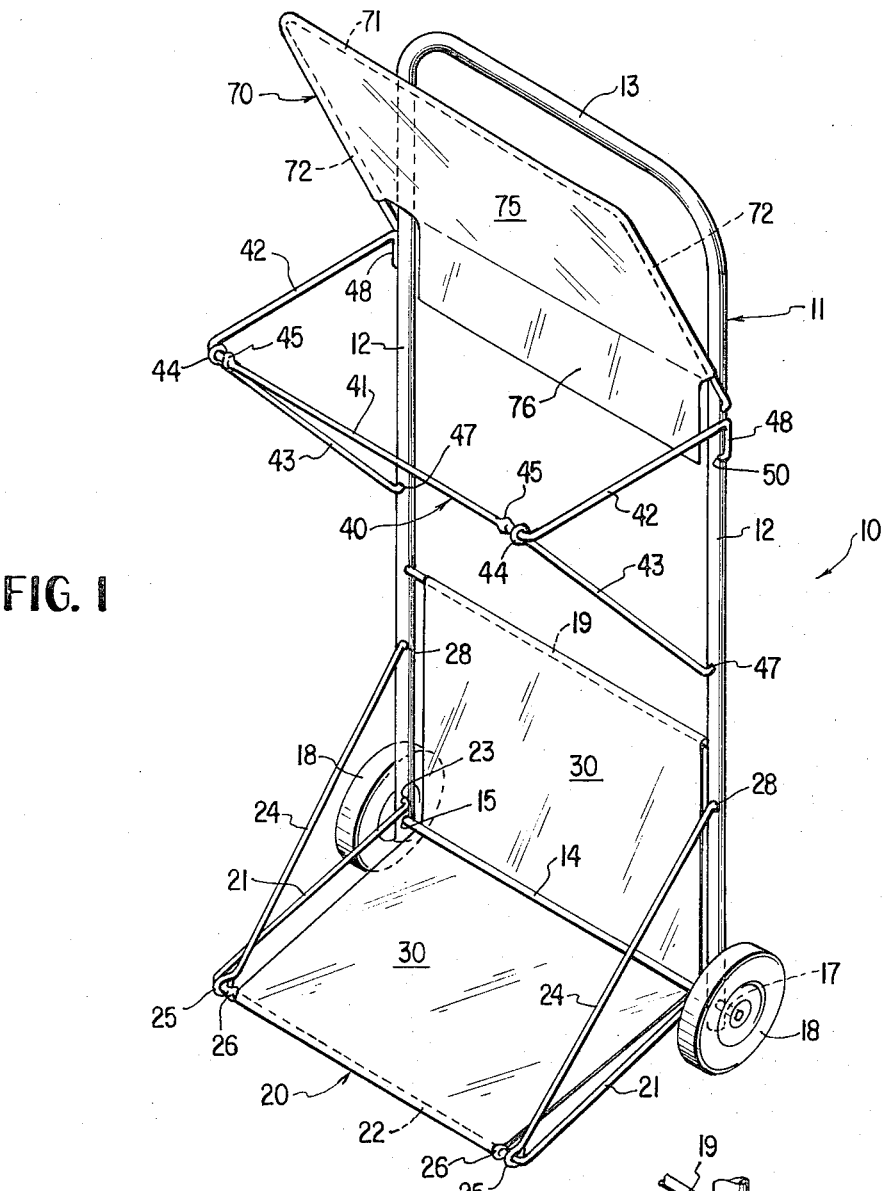
FIG. 1 is a front view, in perspective, showing the assembled cart with the lid frame in an inclined position.

Referring now to the detailed features as depicted in the drawings, FIG. 1 shows the assembled cart, with the various components in place. In the illustrated embodiment, as shown in FIG. 1, the cart 10 comprises a main frame 11 having an inverted U-shape configuration, with two legs 12 extending downwardly, the cross member 13 of the frame serving as a handle. A transverse axle 14 passes through openings 15 at the lower ends of legs 12, being fixed in and projecting beyond the outer sides of the legs, the extending portions 17 of the axle serving as mounts for wheels 18. The main frame 11 is also provided with a cross-brace member 19 extending between legs 12 at a point toward the lower ends of the legs. The frame is tubular, and preferably made of a light metal such as aluminum or magnesium, or thin wall steel tubing.

The main frame 11 has attached thereto three independent detachably mounted structures, which cooperate to perform the functions of supporting a bag, holding open the upper edge of the bag, and providing the bag with an effective cover. These structures are shown in place in FIG. 1, and more detailed structural features are illustrated in the accompanying Figures.

Figure 5:
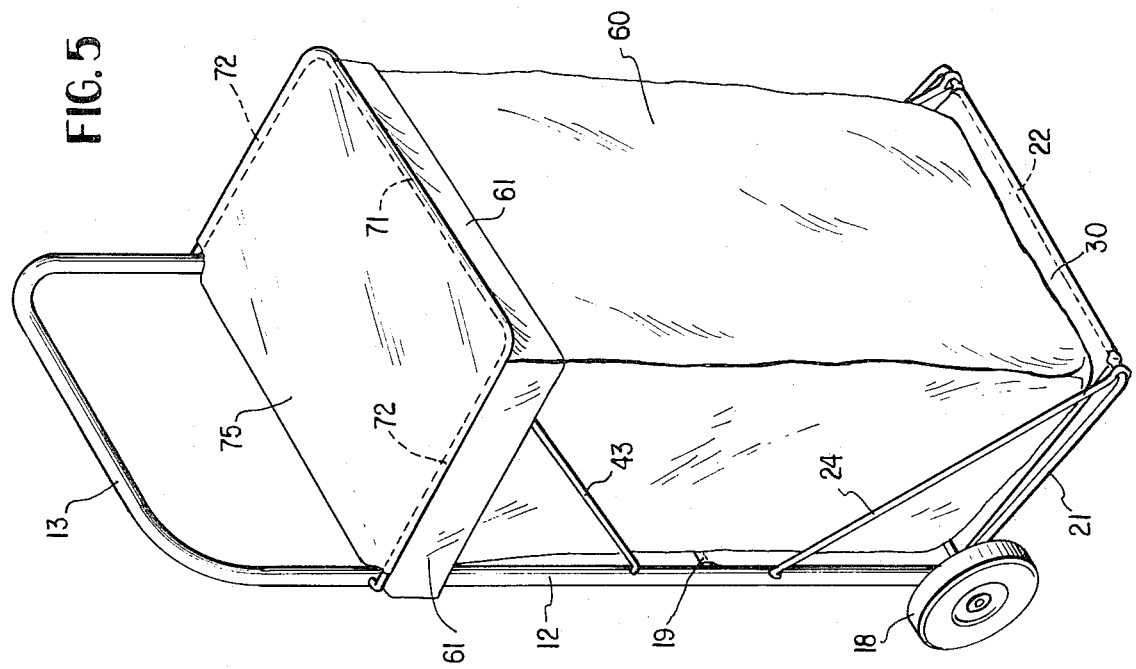
FIG. 5 is a view in perspective showing the assembled cart with a flexible bag in place thereon, with its edge draped over the bag opening frame, and with cover member in place.
Figure 7:
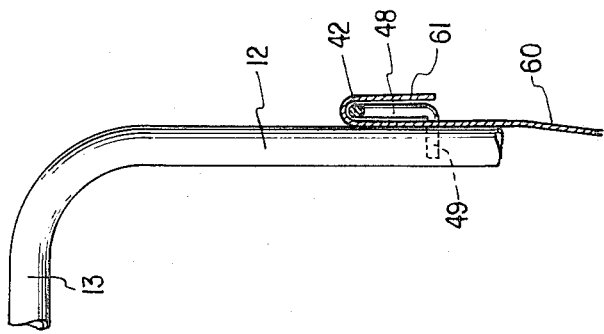
FIG. 7 is a schematic view showing the manner in which the braces of the bag opening and bag supporting frames are fitted into the main frame.

The bag supporting means and the manner in which it is utilized are illustrated in FIGS. 1 and 5. It comprises a frame 20 of stiff metal wire of fairly heavy gauge, formed into a general U-shape, having parallel side members 21, and a cross-member 22. The side members 21 are adapted to extend into and be engaged within holes 23 in main frame legs 12. Frame 20 is maintained in a position approximately perpendicular to the plane of main frame 11 by a pair of brace members 24 which are also made of stiff metal wire, and provided with loops 25 at their lower ends, which loops movably engage the cross-member 22 of frame 20, being held in place against excess lateral movement by a raised portion 26, formed into the cross-member 22, so as to provide a detent or swedge. The braces 24 extend upward at an angle toward the legs 12. Each brace has a short bent portion 27 at its upper end, as shown in FIG. 7, said portion extending into and being engaged by a hole 28 in each leg 12. This construction permits the braces to be slipped in or out of position only when in a parallel direction with the legs 12. Once the frame 20 has been put into position, these braces cannot come out of their own installed position because of the engagement of the bent portions 27 with the openings in the main frame legs.

Figure 2:
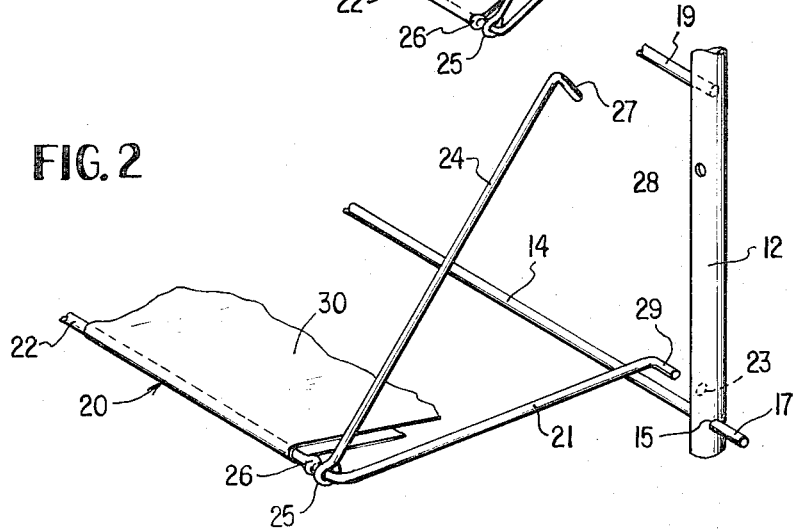
FIG. 2 is a view in perspective showing the configuration and construction of one side of the bag supporting frame and its brace, and the manner of attachment to the main frame.

In the embodiment shown in FIG. 1 and in more detail in FIG. 2, the frame side members 21 terminate in outwardly bent portion 29, which engages frame leg via holes 23, which are on the insides of legs 12, the frame 20 having a sufficient width to provide a spring action of the side members 21 against the main frame legs 12, thereby holding the frame 20 securely in place.

As a means of supporting the trash bag itself, there is fitted over frame 20 and cross brace member 19, a web of a flexible material 30, which may be a fabric such as canvas, but is advantageously a plastic material such as polyethylene or polyvinyl chloride. Preferably the web 30 is formed from seamless polyethylene tubing of appropriate width which is fitted to the cart so that one extremity extends around cross-member 22 of frame 20, and the other extremity around cross-brace member 19, thus providing a two-ply panel 30, with both plies passing under and around axle 14. The polyethylene or fabric should be of sufficient thickness and strength to provide adequate support for a trash bag 60 resting thereon.

The trash bags with which the present invention are concerned are the conventional, disposable type, made of flexible sheet material, such as paper, laminated paper, or of a plastic sheet material, such as polyethylene, having its lower end sealed, and its upper end open and capable of being distended in order to receive deposits of trash, leaves, grass, and the like.

Figure 3:
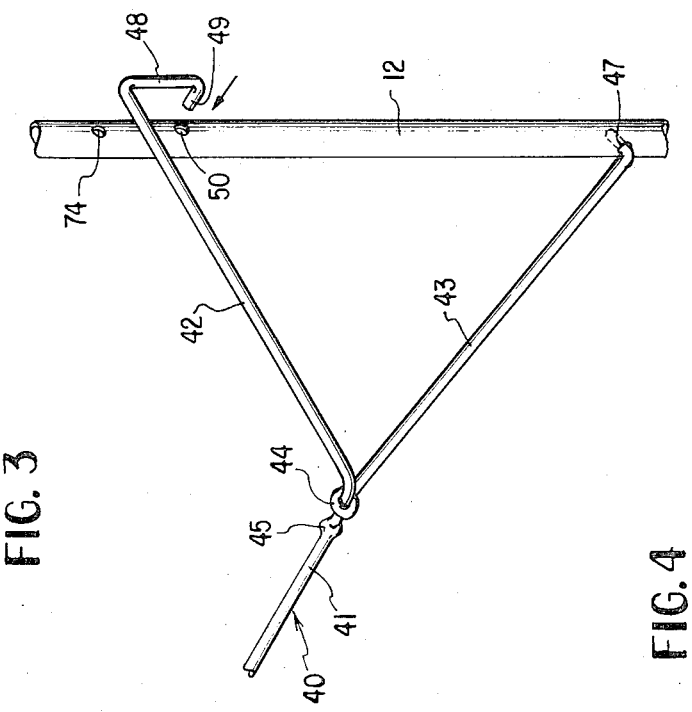
FIG. 3 is a view in perspective showing the configuration of one end of the frame which serves to hold open the upper edge of the bag, and the manner of attachment to the main frame.
Figure 6:
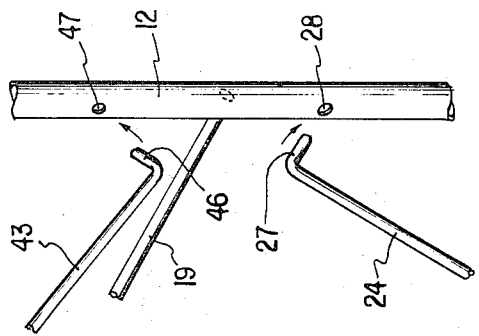
FIG. 6 is a schematic view showing the manner in which the upper edge of the bag is held against the main frame by the bag opening frame.

The means provided, in accordance with the invention, for holding open the upper end of the bag, is located generally in the upper portion of main frame 11, and is shown in FIGS. 1 and 5, and in more detail in FIGS. 3 and 6. It comprises a frame 40 of stiff metal wire having a general U-shape, having parallel side members 42, and a cross-member 41. Frame 40 is maintained in a position approximately perpendicular to the plane of main frame 11 by a pair of brace members 43 which are also made of stiff metal wire. The brace members 43 are provided at their upper ends with loops 44, which movably engage the cross-member 41 of frame 40, being held in place against excess lateral movement by a raised portion 45, formed into cross-member 41, which provides a detent or swedge. The braces 43 extend downward at an angle towards main frame legs 12. Each brace 43 has a short bent portion 46 at its lower end, as shown in FIG. 7, said portion extending into and being engaged by a hole 47 in the front face of legs 12. This construction also permits the braces to be slipped in or out of position only when in a parallel direction with legs 12. Once the frame 40 has been put into position, these braces also cannot come out of their installed position because of the engagement of the bent portions 46 with the openings 47 in the main frame legs.

In the embodiment shown in FIG. 1, and in more detail in FIGS. 3 and 6, the device 40 for holding open the bag incorporates side members 42 to the main frame legs 12 also provides the means for holding the upper edge of the open bag firmly in place between the side members and the main frame by a clamping action, as will be explained more fully below.

Each frame side member 42 terminates in a bent portion 48, which extends downwardly in a direction perpendicular to that of member 42, said portion 48 being of a length adapted to accommodate the edge of a bag draped over member 42. The portion 48, in turn terminates in an inwardly disposed short leg 49, which extends into a hole 50 on the outside of main frame leg 12, as shown in FIG. 3. The dimensions of frame 40 are such that the side members 42 are caused to bear against the outside surface of frame legs 12 with a spring action, thereby holding the edge 61 of bag 60, draped over the side member 42, tightly against the outside of the frame legs 12, with a clamping action, as shown in FIG. 6.

This unique construction results in holding the bag open evenly and completely on three sides of frame 40. It permits the cart to be used in vertical or horizontal position, as in a lawn or garden, or to rake leaves, and the like. The top of the bag is held open without the need of pins, clips, frames, prongs, and the like, characteristic of prior art devices.

In addition to its function of holding open the bag, the frame 40 also serves as a resting place and support for the cover component when the latter is lowered, thereby providing a secure closure for the open bag, while it is still in process of being filled.

Figure 4:
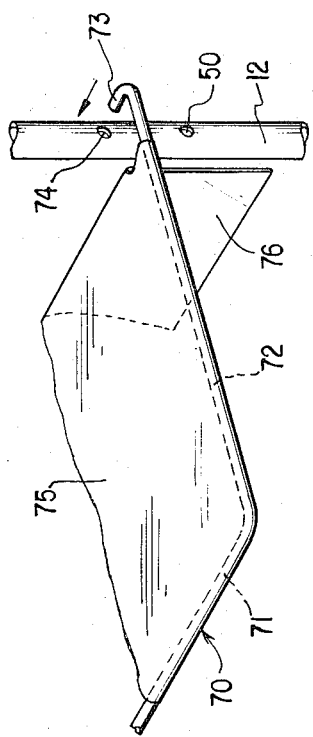
FIG. 4 is a view in perspective showing one cover frame configuration, and with a plastic web and dependent flap in place thereon, and the manner of fastening same to the main frame.

As shown in FIG. 1 the cover comprises a frame 70 of heavy metal wire, formed into a general U-shape, having parallel side members 72, and a cross-member 71. As shown in more detail in FIG. 4, the side members 72 terminate in a bent portion 73, which is in the same plane as frame 70, but perpendicular to side members 72. The portion is adapted to extend into and be engaged within holes 74, which are on the outside of the main frame legs 12. The dimensions of frame 70 are such that it will exert a spring action against the main frame, being held securely in place, while at the same time the frame 70 can pivot about the axis or hinge formed by portions 73, so that the cover can be raised or lowered as desired. The cover frame 70 is fitted with a web 75 of a flexible material, such as a plastic material for example, polyethylene or polyvinyl chloride, or of a fabric such as canvas or other cloth. The web 75 extends rearwardly from cross member 71 past the hinge portion formed by portions 73, terminating in a flap 76, approximately 6 inches in length, which can be inserted into the rear of the trash bag to provide more complete covering, as shown in FIG. 4.

In order to hold the cover in open position, a flexible material envelope may be lowered over the handle 13 and the raised cover, thereby permitting free loading of the bag.

Figure 8:
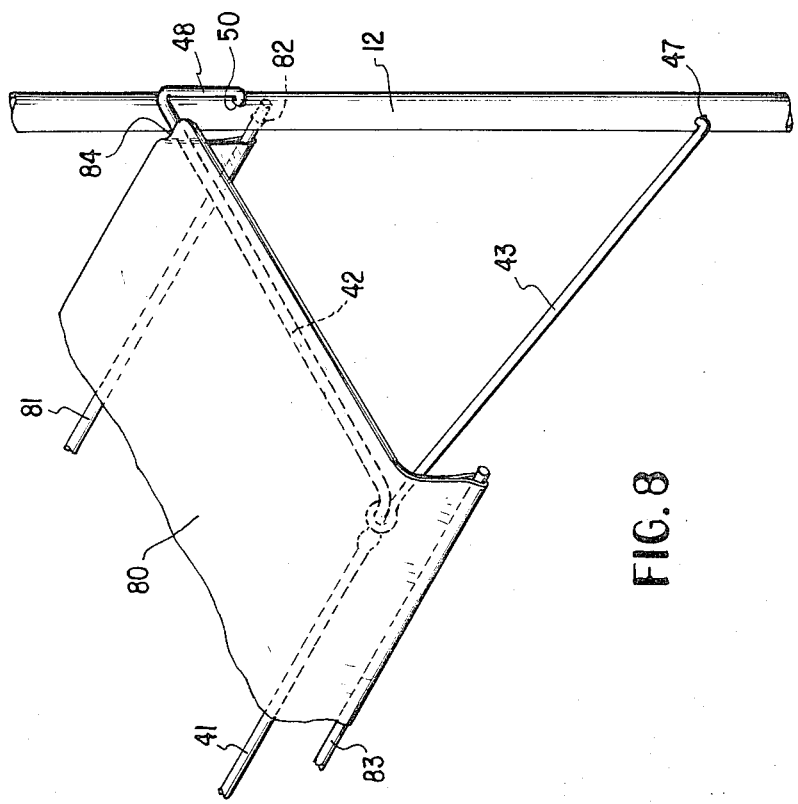
FIG. 8 is a view in perspective of an alternate cover arrangement.

An alternate form of cover is shown in FIG. 8. It comprises a polyethylene or other flexible plastic tube 80 secured to the legs 12 by a wire rod 81 that is placed below holes 50. This rod is placed in the frame in holes 82 drilled on the inside of the legs of the frame. The tubing 80 goes around the rod 81 and up over the back edge of the bag, making a tight seal. It extends forward about 3 inches past the front edge of the bag opening frame 40. A wire rod 83 is secured to the front edge of the tubing as shown. The weight of the rod 83 causes the cover to seal down over the front edge of the bag opening. A notch 84 is cut out of the tubing to allow it to go around the legs 12 of the main frame and give a better fit. To open the cover, the weighted front edge 83 of the cover is simply raised and hung over the handle 13.

As indicated, the cart of the present invention is both collapsible and portable. The manner of assembly of the cart is as follows: Usually, the wheels are attached to the axle on the main frame, using any conventional means, such as press-on self-locking caps, to hold the wheels in place. Thereafter the holding frame 20 and its brace components are connected to the main frame legs. The plastic web forming a part of the holding frame is introduced at the same time. The means 40 for holding open the edge of the bag is then connected to the frame, with attendant brace members. Finally the cover member 70 is attached. The bag is then placed on the holding platform, the open edge of the bag is draped over the three sides of frame 40, and clamped against the main frame legs 12 by the member 48, the cover is held in open position, and the bag is ready for loading. In order to disassemble the cart, the various components are removable, in the same manner.

In addition to the advantages indicated above, other advantages of the device of the invention are its readily portability and the ease of installation, filling and removal of the trash bag. A filled bag may be readily slid off the front of the cart without the necessity of raising it. The collapsibility of the cart makes it readily adaptable for packaging, storage and marketing. It may be simply assembled without the need of any tools. The various frames and braces are easily attached by insertion into the main frame as previously described and the axle slips through holes provided in the legs, with the wheels easily attached to the ends of the axle. The unique bent portion of the frame which holds the bag open also serves to clamp the upper end of the bag to the main frame, thus providing easy detachment or removal of the bag without the need of auxiliary clips, clamps, or pins. The supporting braces of the respective frames can easily be placed in position for use by insertion in parallel position as previously described, and are locked into place once the wire frame is secured to the main frame and cannot become disconnected even if the cart is roughly handled or placed in a horizontal position for filling or emptying. The plastic film forming a platform for the bag, offers a unique method of suspension that is simple, light weight, and trouble-free. The plastic material is readily installed and is not subject to rusting, rotting or deterioration and can be easily and inexpensively replaced if accidentally damaged or destroyed. The supporting rod can be removed by a simple exerted pressure to spring it out of its holes in the main frame legs and slipping it back through a replacement sling of plastic tubing and the bag support frame can be removed and inserted into the tubing and reconnected in the same way. The hinged cover provides a convenient means for concealing unsightly and odorous trash and of keeping out flies and other insects, while at the same time providing easy access to the interior of the bag.

What is claimed is:

1. A collapsible and portable cart for flexible trash bags, comprising:
   a. an inverted generally U-shaped tubular main frame including spaced parallel legs and a transverse handle portion between the upper portions of said legs, an axle passing through the lower portions of said legs, and supporting wheels mounted on the outer ends of said axle;
   b. means for supporting a flexible bag comprising a generally U-shaped frame detachably and pivotably mounted on said tubular frame, said supporting frame carrying thereon the edges of a web of flexible material extending across the open portion of said frame and providing a platform for said bag; and
   c. means for holding open the upper end of the bag for loading, comprising a generally U-shaped frame detachably mounted on said tubular frame at a level corresponding to the height of the bag, said frame including means for clamping the open edge of said bag against the outer sides of the legs of said tubular frame by spring action, the dimensions of the frame being such that the outer portions will bear against the outside surface of said legs to hold the bag edge tightly against said legs.

2. The apparatus of claim 1 which further includes means for covering the bag top including a web of flexible material attached to said main frame providing a closure for said bag.

3. The apparatus of claim 1 in which said bag supporting means frame terminates at each end in an outwardly bent portion which engages an opening on the inside of the corresponding main frame leg, being held in place by spring action of said frame, said frame being held in a position generally perpendicular to the plane of said main frame by a pair of upwardly extending brace members each connected at its upper end to a leg of said main frame, and at its lower end rotatably connected to said supporting frame.

4. The apparatus of claim 1 in which further includes a cross-brace member connecting the lower portions of said main frame legs, and said flexible supporting web extends between the outer edge of said supporting frame and said cross-brace member, and around said axle.

5. The apparatus of claim 1 in which said means for holding open the upper end of the bag includes means for holding said bag opening frame in a position generally perpendicular to the plane of said main frame comprising a pair of downwardly extending brace members each connected at its lower end to a leg of said main frame, and at its upper end rotatably connected to said bag opening frame.

6. The apparatus of claim 1 in which said frame for holding open the upper end of the bag includes side members terminating in a bent portion which extends downwardly and perpendicular to said side member and is adapted to accommodate the edge of said bag draped over said side member, and further terminating in an inwardly bent portion adapted to extend into an opening on the outside of the main frame leg, thereby holding the edge of the bag against the legs with a spring action.

7. The apparatus of claim 2 in which same cover frame includes side members terminating in inwardly bent portions adapted to extend into openings on the outside of said main frame legs, thereby providing hinged operation for said covering means.

8. The apparatus of claim 2 in which said web of flexible material for covering the bag top includes a downwardly extending flap portion.

9. The apparatus of claim 2 which includes a transverse brace member connecting said main frame legs above the plane of said U-shaped frame, and said web of flexible material extends forward from said brace member over the front portion of said U-shaped frame terminating in a weighted downwardly extending flap portion.

* * * * *

UNITED STATES PATENT OFFICE
CERTIFICATE OF CORRECTION

Patent No. 3,797,847          Dated March 19, 1974

Inventor(s) Eleanor Ruth Lindsey and Gordon A. Lindsey

It is certified that error appears in the above-identified patent and that said Letters Patent are hereby corrected as shown below:

The Title of the patent should read:

COLLAPSIBLE AND PORTABLE CART FOR FLEXIBLE TRASH BAGS

The address of the Inventors should read:

2124 E. Cortez St.

Signed and sealed this 18th day of June 1974.

(SEAL)
Attest:

EDWARD M. FLETCHER, JR.　　　　　　　　C. MARSHALL DANN
Attesting Officer　　　　　　　　　　　　Commissioner of Patents